J. J. QUERTINMONT.
FLOATER OR GLASS DRAWING RING.
APPLICATION FILED APR. 20, 1914.
1,130,537.
Patented Mar. 2, 1915.
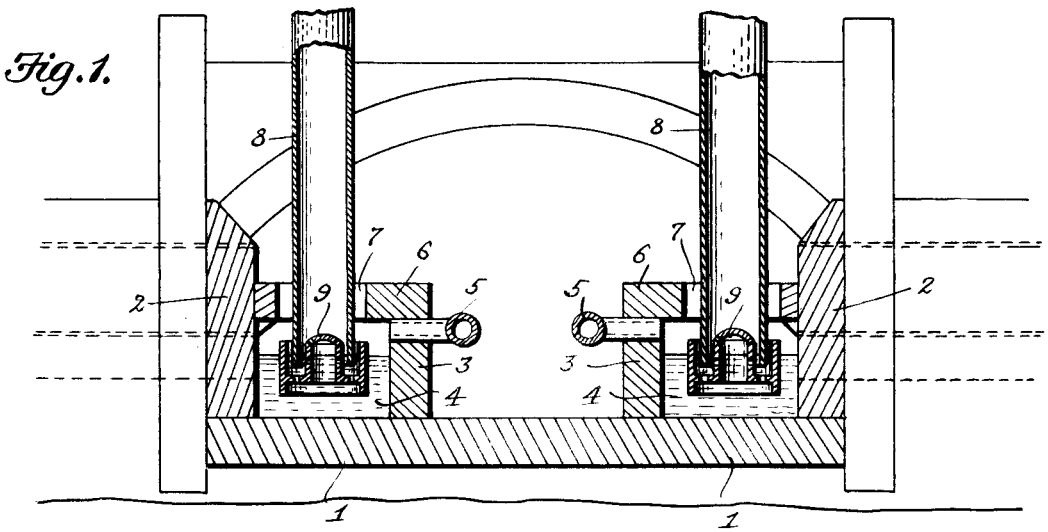
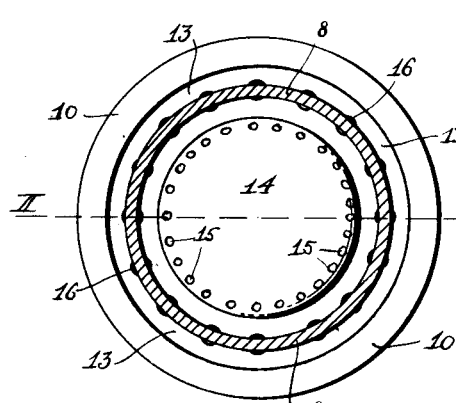
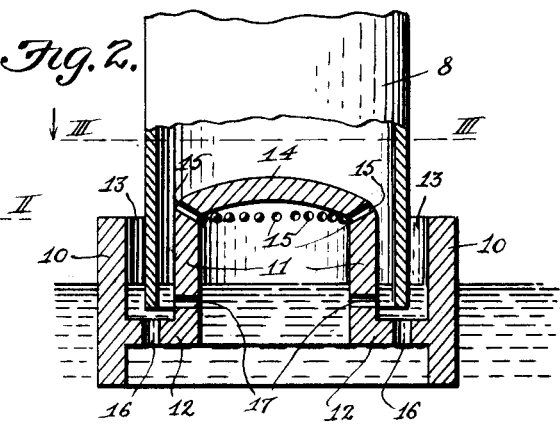
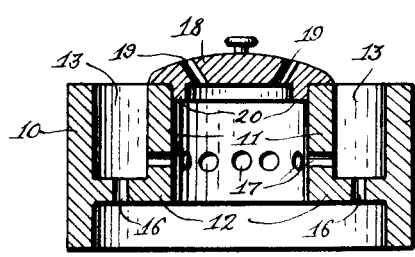

UNITED STATES PATENT OFFICE.

JULES J. QUERTINMONT, OF POINT MARION, PENNSYLVANIA.

FLOATER OR GLASS-DRAWING RING.

1,130,537.　　　　Specification of Letters Patent.　　Patented Mar. 2, 1915.

Original application filed August 2, 1913, Serial No. 782,655. Divided and this application filed April 20, 1914. Serial No. 833,131.

*To all whom it may concern:*

Be it known that I, JULES J. QUERTINMONT, a citizen of the United States, residing at Point Marion, in the county of Fayette and State of Pennsylvania, have invented certain new and useful Improvements in Floaters or Glass-Drawing Rings, of which the following is a specification.

My invention relates to certain new and useful improvements in glass drawing rings, and more particularly to automatic glass drawing rings or floaters, and has for its primary object the provision of means whereby purified or molten glass may be readily taken from a tank by the bait introduced into the floater, said glass being separated from all impurities or foreign substances that are usually found in tank furnaces.

When drawing glass from a tank, the foreign substances or impurities being of less specific gravity than the glass will always float upon the surface of the same, and when the glass is handled these impurities will combine with the same and an inferior quality of ware is produced.

To produce a drawing ring from which pure glass may be easily taken, and, furthermore, to produce a device of this class into which glass will be automatically supplied, is the aim of this invention.

A further object of the invention is to produce a device of the above-described character that will be extremely simple in construction, strong, durable, and highly efficient in its operation, and furthermore, one that will be comparatively inexpensive to manufacture.

With the above and other objects in view the invention finally consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which:—

Figure 1 is a transverse section of a double tank furnace showing a floater or drawing ring in position in each tank; Fig. 2 is a transverse section of the floater on an enlarged scale, on line II—II of Fig. 3; Fig. 3 is a section on line III—III of Fig. 2; and Fig. 4 is a transverse section similar to Fig. 2, of a modified form.

Referring to Fig. 1 of the drawings, 1 represents the bottom of a double tank furnace, having the side walls 2, 2, and inner walls 3, 3, which form the drawing tanks 4, 4, containing the molten glass. The glass is retained in the molten condition by the usual gas burners or heaters 5, 5, which may be of any desired construction. The tops of the tanks 4, 4, are provided with removable covers 6, 6, having openings 7, 7, through which the bait 8 is thrust to be attached to the molten glass, purified by passing through the improved form of drawing ring or floater 9, which is floating on the molten glass within the chambers or tanks 4, 4, as shown.

I do not herein make claim to the specific construction of the tank, as that is the subject-matter of a separate application, Serial No. 782,655, filed by me on August 2, 1913, of which this case is a division.

The present invention is more clearly and particularly shown in Figs. 2 and 3, and consists of a floater or drawing ring comprising an outer section 10 and an inner section 11 separated from and connected integrally with the outer section 10, by means of, preferably, a horizontal extension 12, thereby forming a pocket or recess 13 between the sections 10 and 11, as shown. Said inner section 11 is provided with a top 14 having holes 15 for the purpose of permitting any air or gas to escape, which might accumulate in the chamber formed by the surface of the molten glass within the section 11 and the top 14. A series of holes 16 are formed in the horizontal extension 12 which connects the bottom of the floater with the recess 13 between sections 10 and 11, whereby the clean glass at the bottom of the floater will readily pass into the recess 13, to be engaged by the bait 8, and also quickly replenish the supply of molten glass that is withdrawn as the bait 8 is elevated to form the glass tubes, for making plate glass. A single inner vertical wall 11 and a single outer vertical wall 10 are provided so that a floater or drawing ring of efficient weight is obtained, while at the same time the molten glass in the tank will be separated from the glass in the recess 13 by a minimum of insulating space and material of the walls 10 and 11. This construction and arrangement insures that the molten glass, after it passes through the holes 16 or 17 into the recess 13 formed by the walls 10 and 11, and from which it is drawn by the bait 8, will not be chilled and thereby affect the quality of the finished plate.

In order to expedite the flow of glass into the floater, I may also provide an additional series of holes 17 through the inner section 11, as shown, whereby the clean and purified glass within the section 11, and bottom of the floater can quickly pass into the recess 13 in lateral or horizontal streams. The outer section 10 may be extended any height above or distance below the point at which the horizontal extension 12 is connected to said section 10, in order to shield the molten glass within the recess 13, or vary the level below the surface of the glass at which the glass is taken into the bottom of the floater and passed through the holes 16 or 17, into the recess 13.

While in Figs. 2 and 3 the top 14 is shown as being made integral with the inner section 11, said top may be made separate and formed as a removable cover 18, as shown in Fig. 4, said cover 18 being provided with openings 19, and held from sliding off by means of the inner lug or flange 20.

While I have shown and preferably use a floater which is of cylindrical form, I do not limit myself to this particular construction, as the same may be made of other shapes, without departing from the spirit of my invention.

The operation of the invention is as follows: The molten glass in the tanks 4, 4, being in a highly fluid state, the drawing ring or floater 9, made of fire clay, floats in the liquid glass in the tanks so that the refined or purified glass at the bottom of the floater and a sufficient distance below the surface of the glass in the tanks, readily flows through the openings 16 and 17 of the floater into the recess or pocket 13, when said refined glass may be properly attached to the end of the bait 8 lowered through the opening 7, said bait being raised in any suitable manner, not shown, and which forms no part of this invention, and the glass blown in cylindrical form to be made into window glass, as understood by those skilled in the art. If it is desired to examine the glass within and under the floater, the cover 18 shown in Fig. 4, may be removed, when the surface of the glass will be exposed and any impurities can be readily taken out if found necessary.

What I claim is:—

1. A floater for glass furnace drawing tanks comprising a perforated bottom section, a single inner vertical wall and a single outer vertical wall separated from each other and extending upwardly from the upper side of and connected to the perforated bottom and of such relative dimensions as to project a substantial distance above the level of the glass in the tank, thereby forming a single pocket or trap for molten glass between said walls above the upper plane of the bottom and adapted to receive the molten glass under a substantial head.

2. A floater for glass furnace drawing tanks comprising an outer annular vertical section, an inner annular vertical section connected at its lower portion to the interior of the outer section by a perforated extension, thereby forming an annular pocket between said sections open at its top and partially closed at the bottom and a circular chamber within the inner section, the bottom of said annular pocket having communication with the outside of the bottom of the floater and the circular chamber formed by the inner section.

3. A floater for glass furnace drawing tanks comprising an outer vertical section, an inner vertical section, a horizontal section connecting the lower end of the inner section to the inner side of the outer section, a cover over the top portion of the inner section, thereby forming a pocket between said inner and outer sections open at its top and closed at the bottom, the bottom of said pocket having communication with the outside of the floater by means of perforations in the horizontal section of said floater.

4. A floater for glass furnace drawing tanks comprising an outer vertical section, an inner vertical section, a horizontal section connecting the lower end of the inner section to the inner side of the outer section, a cover over the top portion of the inner section, thereby forming a pocket between said inner and outer sections open at its top and closed at the bottom, the bottom of said pocket having communication with the outside of the floater by means of perforations in the inner vertical section of said floater.

5. A floater for glass furnace drawing tanks comprising an outer vertical section, an inner vertical section, a horizontal section connecting the lower end of the inner section to the inner side of the outer section, a removable cover over the top portion of the inner section, thereby forming a pocket between said inner and outer sections open at its top and closed at the bottom, the bottom of said pocket having communication with the outside of the floater by means of perforations in the horizontal section of said floater.

6. A floater for glass furnace drawing tanks comprising an outer annular vertical section, an inner annular vertical section concentric with the outer section, a horizontal annular section connecting the lower end of the inner section to the inner side of the outer section, thereby forming an annular pocket between said inner and outer sections open at its top and closed at the bottom, the bottom of said pocket having communication with the outside of the floater by means of perforations in the horizontal section of said floater, and a circular cover over the top portion of the inner section.

7. A floater for glass furnace drawing tanks comprising an outer annular vertical section, an inner annular vertical section concentric with the outer section, a horizontal section connecting the lower end of the inner section to the inner side of the outer section, thereby forming an annular pocket between said inner and outer sections open at its top and closed at the bottom, the bottom of said annular pocket having communication with the outside of the floater by means of perforations in the lower end of the inner vertical section of said floater, and a cover over the top portion of the inner section.

In testimony whereof I affix by signature in presence of two witnesses.

JULES J. QUERTINMONT.

Witnesses:
B. L. SOUTH,
GEORGE N. JONES.